US012747022B2

(12) United States Patent
McChesney et al.

(10) Patent No.: US 12,747,022 B2
(45) Date of Patent: Sep. 29, 2026

(54) METHOD FOR PRECISION LOCALIZATION OF AIRCRAFT IN DYNAMIC Euclidean REFERENCE FRAMES WHILE MOVING

(71) Applicant: Target Arm Inc., Ridgefield, CT (US)

(72) Inventors: Jeffrey Alan McChesney, Ridgefield, CT (US); Ryan Bennett Bigham, Sandy Hook, CT (US); Ankit Kumar, Woodbury, CT (US)

(73) Assignee: Target Arm Inc., Ridgefield, CT (US)

(*) Notice: Subject to any disclaimer, the term of this patent is extended or adjusted under 35 U.S.C. 154(b) by 79 days.

(21) Appl. No.: 18/897,012

(22) Filed: Sep. 26, 2024

(65) Prior Publication Data

US 2026/0084813 A1 Mar. 26, 2026

(51) Int. Cl.
*B64U 70/20* (2023.01)
*B64D 5/00* (2006.01)

(52) U.S. Cl.
CPC ............... *B64D 5/00* (2013.01); *B64U 70/20* (2023.01)

(58) Field of Classification Search
CPC .......... B64D 5/00; B64U 70/20; B64U 70/30; B64U 70/00; B64U 80/10
See application file for complete search history.

(56) References Cited

U.S. PATENT DOCUMENTS

| | | | |
|---|---|---|---|
| 7,410,125 | B2 | 8/2008 | Steele |
| 8,205,512 | B1 | 6/2012 | Michalski et al. |
| 8,983,172 | B2 | 3/2015 | Steffenson |
| 9,505,493 | B2 | 11/2016 | Borko |
| 9,650,156 | B2 | 5/2017 | Mcchesney |
| 9,845,165 | B2 | 12/2017 | Michalski et al. |
| 10,077,095 | B1 | 9/2018 | Mcchesney |
| 10,457,419 | B2 | 10/2019 | Mcchesney |
| 10,759,052 | B2 | 9/2020 | Scott et al. |
| 10,843,814 | B2 | 11/2020 | Michalski et al. |
| 10,960,976 | B2 | 3/2021 | Bosma et al. |
| 10,974,911 | B2 | 4/2021 | Zevenbergen et al. |
| 11,116,145 | B2 | 9/2021 | Nitsch et al. |
| 11,235,874 | B2 | 2/2022 | Jones et al. |
| 11,505,330 | B2 | 11/2022 | Bosma |
| 11,591,105 | B2 | 2/2023 | Bosma |
| 11,591,106 | B2 | 2/2023 | Bosma |

(Continued)

FOREIGN PATENT DOCUMENTS

| | | | |
|---|---|---|---|
| ES | 2927298 | T3 | 11/2022 |
| WO | WO-2016/137982 | A1 | 9/2016 |
| WO | WO2021223125 | A1 | 11/2021 |

*Primary Examiner* — Bao Long T Nguyen
(74) *Attorney, Agent, or Firm* — Foley & Lardner LLP

(57) ABSTRACT

The present invention relates to capturing and launching autonomous aircraft from moving vehicles. It provides a solution to an aerodynamic problem by enabling precision localization while a host vehicle is moving. This invention is distinguished by using precise local reference frames instead of global reference frames, which enables operations at all speeds. The invention may be used for package delivery, logistics, first responders and the military. The method includes an autonomous aircraft, a host vehicle and an articulated capture device with each of them moving. The invention significantly improves upon existing methods by enabling autonomous aircraft operations with vehicles across a wide range of speeds from zero to highway speeds and beyond.

25 Claims, 5 Drawing Sheets

(56) References Cited

U.S. PATENT DOCUMENTS

| | | | | |
|---|---|---|---|---|
| 11,618,584 | B2 | 4/2023 | Bosma | |
| 11,623,760 | B2 | 4/2023 | Bosma | |
| 11,634,237 | B2 | 4/2023 | Bosma | |
| 11,639,233 | B2 | 5/2023 | Bosma | |
| 11,663,233 | B2 | 5/2023 | Alexeev et al. | |
| 12,012,221 | B2 | 6/2024 | Michalski et al. | |
| 2006/0249622 | A1 | 11/2006 | Steele | |
| 2019/0392211 | A1 | 12/2019 | Hartman | |
| 2022/0120918 | A1* | 4/2022 | Makineni | G01S 19/53 |
| 2022/0308596 | A1* | 9/2022 | Morris | G05D 1/102 |
| 2023/0008634 | A1* | 1/2023 | Kabakov | B64F 1/007 |
| 2023/0271720 | A1 | 8/2023 | Michalski et al. | |

* cited by examiner

METHOD FOR PRECISION LOCALIZATION OF AIRCRAFT IN DYNAMIC Euclidean REFERENCE FRAMES WHILE MOVING

CROSS-REFERENCE TO RELATED APPLICATION

NA

STATEMENT REGARDING FEDERALLY SPONSORED RESEARCH OR DEVELOPMENT

NA

REFERENCE TO A "SEQUENCE LISTING" (IF APPLICABLE)

NA

BACKGROUND OF THE INVENTION

An aircraft, can be utilized in a range of applications, including combat, photography, sensing and logistics, mapping, payload delivery, firefighting and more. As a result, many operational needs are challenging, hazardous, or otherwise impractical for manned aircraft or ground-based systems. Fortunately, some key capabilities of aircraft include extended reach, enhanced safety, reduced costs, real-time data collection, speed, range and versatility.

With the advent and maturity of precision localization and autonomous flight controllers, the potential to use autonomous aircraft, also called drones, in various new use cases is profound. In addition, the maturity of autonomous aircraft, both rotary wing and fixed wing, provides wide use worldwide. Even so, as our modern society becomes more mobile every day, our use of autonomous aircraft with moving host vehicles is non-existent. Consequently, many new business models that utilize drones from moving vehicles have not been implemented successfully to date. Examples include package delivery trucks with drones, oil & gas well head inspections, delivering goods and services directly from ships offshore to moving trucks and bypassing docks, or in reverse, and many more.

The one big challenge and problem using autonomous aircraft, though, is their inability to be autonomously launched and recovered from a moving platform easily and reliably. Even if autonomous launch capabilities are achievable, autonomous recovery remains problematic due to the difficulty in accurately localizing between different frames of reference that are themselves moving in six degrees of freedom. Currently, successful autonomous recovery of an aircraft typically requires the host vehicle to come to a complete, or near complete, stop, which severely limits operational flexibility and efficiency. In a military environment, it may also be lethal. Overcoming this stopping problem is essential for improving the versatility and practicality of autonomous aircraft operations in dynamic environments.

Moreover, regardless of whether the aircraft is fully autonomous or remotely controlled, human intervention is typically required for both launching and recovering the aircraft. As the number of aircraft increases, the amount of human interaction required grows proportionally, demanding more personnel and oversight. This reliance on human oversight restricts the potential for fully automated operations, especially when the aircraft needs to be deployed or recovered while the vehicle or platform is in motion. Overcoming the challenge of very precise localization between moving frames of reference enables seamless and efficient aircraft deployment and recovery, reducing the need for human involvement and enhancing the overall efficiency of autonomous aircraft and drone operations.

Existing methods for the autonomous launch and recovery of aircraft generally rely on fixed platforms or specialized equipment, such as catapults for launch and nets, cables or robotic mechanisms for recovery. These systems are effective in static or semi-static environments, where both the aircraft and the platform are stationary or moving at relatively low speeds. In some cases, recovery systems are integrated into vehicles, but they still require the vehicle to stop to safely retrieve the aircraft. These solutions typically use vertical landing as their primary method for a static location due to their inaccuracies with traditional localization methods.

However, these methods present several disadvantages. They often rely on large, cumbersome, or costly equipment, making them impractical for mobile applications or smaller vehicles. Moreover, the need for the vehicle to come to a stop or slow down for recovery severely limits operational flexibility, particularly in dynamic or fast-paced environments such as military operations, search and rescue missions, or industrial inspections. Windy conditions also hamper vertical landing solutions and methods and induce operational limitations. This approach also does not scale well for large aircraft fleets, where manual oversight for launching and recovering multiple aircraft can lead to delays and inefficiencies.

In addition, existing solutions, such as net-type or wire systems, often require human intervention to disengage the aircraft after recovery. Even in cases where these systems are designed for full autonomy, they still face challenges in precisely localizing the aircraft between different frames of reference, especially at higher speeds. This lack of precision increases the risk of failure or accidents, reduces efficiencies and slows operations as the recovery process lacks the accuracy required for a seamless and reliable operation. In short, these vertical landing/capture methods fail to offer a graceful or efficient recovery, which increases the likelihood of damage to the aircraft and compromises the overall effectiveness of the system.

To overcome this limitation, there is a need for a system and method that enables the precise autonomous capture and launch of aircraft from a moving vehicle, eliminating the requirement for the vehicle to come to a stop, or near stop. To do this reliably, the autonomous aircraft needs to continue flying at the same speed of the host vehicle. This system must be capable of extremely high localization precision and accuracy, and must handle different frames of reference dynamically, even at high speeds. Such a solution significantly reduces the need for human intervention, while enhancing the operational efficiency and responsiveness of aircraft deployment, particularly in dynamic environments where continuous motion is essential. This would be especially beneficial in applications such as military operations, search and rescue missions, and large-scale aircraft logistics management and package delivery.

To achieve extreme localization and precision for capture of autonomous aircraft and drones, traditional systems and methods are inadequate. Most rely upon the macro-cartography and geodetic surveys of the global reference frame called Earth. This global reference frame provides latitude and longitude and altitude for many, many uses, but is not accurate enough for autonomous aircraft capture and launch from moving vehicles. The advent of global navigation systems, like the Global Positioning System—GPS, typically provides 5-10 meters accuracy. This is sufficient for navigating around the earth but is insufficient to bring two co-speed objects close together within a centimeter between them. And this lack of precision problem is compounded with three or more objects. What is needed is a system and method to compute precise localization positions between objects, while moving, on-the-edge. This also demands a local reference frame to achieve the accuracy necessary to bring two or more moving objects closely together.

Lastly, to achieve that level of accuracy, the sensors must be highly accurate themselves and provide very high cycle rates for position updates. These high data rates then require sufficient localized compute, along with a sensor fusion engine to apply position algorithms swiftly. The output then needs high-speed computer hardware and software and communications to direct repositioning of the aircraft, the capture device and the host vehicle to achieve capture and launches on-the-move.

BRIEF SUMMARY OF THE INVENTION

The present invention overcomes the limitations of conventional aircraft systems using global reference frames for navigation, by introducing an advanced system and method for precision localization and stabilization of an articulating mechanism within a localized Euclidean reference frame. This system incorporates specialized algorithms and highly accurate sensors to ensure accurate positioning, even when all local reference points are in motion with relation to each other. The algorithms enable the seamless integration of a moving capture device on a moving vehicle with an autonomous aircraft in flight, allowing for efficient and stable capture and launch while the host vehicle is moving, even at high speeds.

For the purposes of this invention, "aircraft" encompasses various unmanned aerial vehicles, including fixed-wing aircraft, rotary wing aircraft, drones, and any other aerial vehicles that can be remotely or autonomously controlled. The system involves at least three moving bodies within a local frame of reference and the method is using advanced algorithms in a software sensor fusion engine to enable their motion paths to converge with extreme precision for capture or launch while moving. These bodies include a host vehicle, such as a boat, plane, or car; an articulating mechanism, like a robotic mechanism mounted on the host platform, capable of tracking and interacting with the aircraft; a capture device on the articulating mechanism, and an autonomous aircraft.

DETAILED DESCRIPTION OF THE INVENTION

Figure 1:
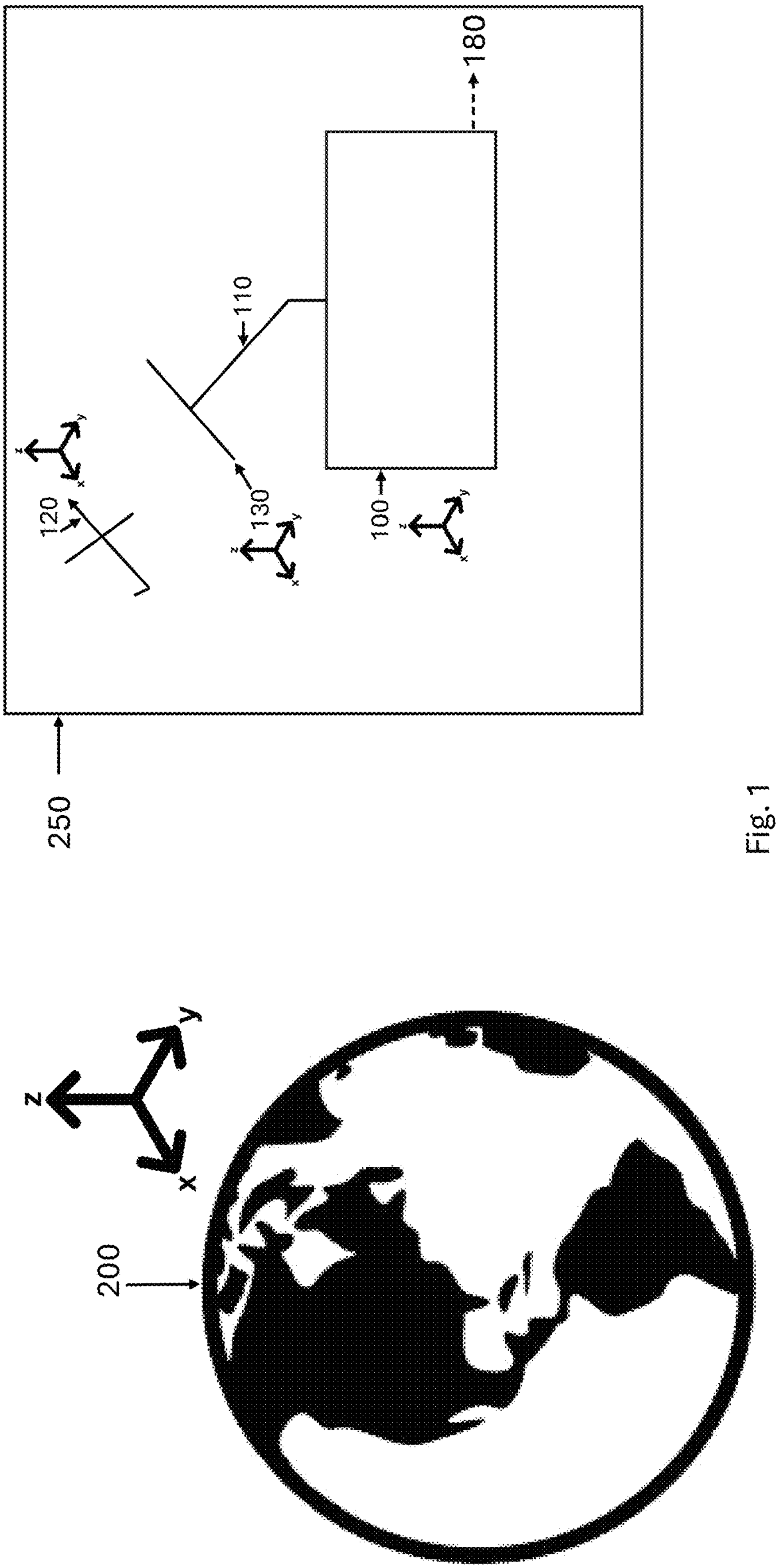
FIG. 1 is a schematic illustration of a global reference frame 200 and a local reference frame system 250 comprising a host vehicle 100 moving in direction 180; with an articulating mechanism 110 attached to host vehicle 100 and also attached to a capture device 130; and an aircraft 120.

FIG. 1 is an illustration of an embodiment of a system and method to launch and capture an aircraft 120 that is moving, with a moving and articulating mechanism 110, that has a capture device 130 that is attached to secure the aircraft 120. Articulating mechanism 110 is attached to a host vehicle 100 that is moving in the direction of 180. All three main moving devices, aircraft 120, capture device 130 and host vehicle 100 have a global reference frame in Euclidean space with relation to singular body 200 outside of the local reference frames within system 250. Within local reference frame system 250, there are three devices or objects that are moving, and each has its own local Euclidean reference frame with x,y and z axes. The position of any of the three moving devices or objects 100, 130 and 120 can be derived from either the global reference frame 200 for six degrees of freedom, or from comparing each devices'or objects'local reference frames. The vehicle 100, articulating mechanism 110, the capture device 130 and the aircraft 120 can move in all six degrees of freedom.

Figure 2:
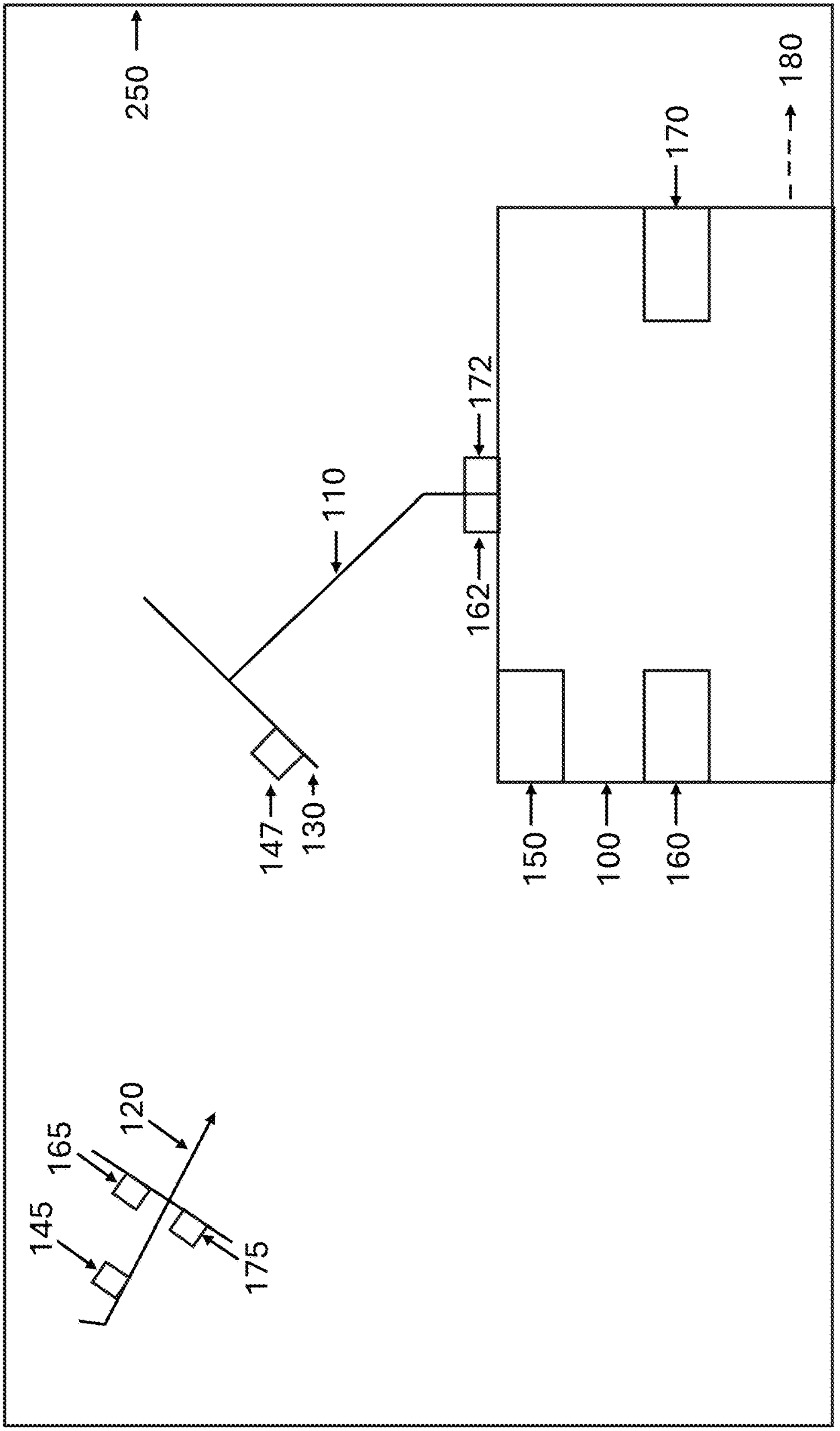
FIG. 2 is a schematic illustration of local reference frame system 250 comprising aircraft 120 approaching host vehicle 100 moving in direction 180; with an articulating mechanism 110 attached with capture device 130; all moving relative to each other.

FIG. 2. is an illustration of local reference frame system 250, which is the same embodiment system and method from FIG. 1, with a host vehicle 100, that can be any moving platform, for example a car, ship, aircraft or train. The dotted arrow line 180 shows the direction of motion of the host vehicle 100 within the local reference frame system and can be defined on any vector within the x, y and z axes. The host vehicle 100 comprises at least one sensor transmitter 150, at least one computer hardware component 160, and at least one communication hardware component 170. Any of the electronic components 150, 160 or 170, can be combined into a merged unit, or located anywhere on the articulating mechanism or capture device 130. The host vehicle 100 has a sensor transmitter 150 for providing relative local position distances and angles to aircraft 120's sensor receiver 145. Aircraft 120 can be an autonomous rotary wing aircraft comprising of at least one blade, or an autonomous fixed wing aircraft. Computer hardware component 160 performs digital method calculations for accelerations and rotational velocities of host vehicle 100 and transmits these data to communication hardware 170, which then transmits to communication hardware 175, and then to computer hardware component 165, which then computes aircraft 120's relative positions between host vehicle 100. These calculations provide relative x,y and z axes locations as well as rotations around each of these axes for relative 6 degrees of freedom calculations. Computer hardware component 162 may also perform digital method calculations for relative positions between host vehicle 100, capture device 130 and aircraft 120. These calculations provide relative x,y and z axes locations as well as rotations around each of those axes for relative 6 degrees of freedom calculations, and command articulating mechanism 110 to position capture device 130 for aircraft 120 capture. Communication hardware component 170 provides bi-directional and unidirectional data messaging and processing between aircraft 120 with its communications hardware component 175, as well as articulating mechanism communications hardware component 172. Simultaneously, sensor transmitter 150 transmits its signals, which are received by sensor receiver 145, and then transmits this data via communication hardware component 175 to computer hardware component 165. Computer hardware component 165 then performs digital method calculations for relative positions between host vehicle 100, capture device 130 and aircraft 120 and commands aircraft 120 to a point around host vehicle 100 and within the articulating mechanism 110's range of motion.

Aircraft 120 comprises of sensor receiver 145 to provide localization position and rotations relative to the host vehicle 100 and capture device 130. The method and algorithms for calculating these relative positions are computed within the aircraft 120's computer hardware component 165. These algorithms provide a calculation for all three reference frames relative to one another via a sensor fusion engine within the computer hardware component 165. The resultant reference location of aircraft 120 then directs the aircraft's flight controller within the computer hardware component 165 to fly towards a Euclidian point designated in relation to host vehicle 100 which is within the capture device 130's range of motion. Similarly, the aircraft 120's communication hardware component 175 transmits the relative localization position to the host vehicle 100's communication hardware component 170, which then transmits it to computer hardware component 160, which then applies an algorithm to define all three moving objects relative positions, and then sends a command message to communication hardware component 170, which sends the command to the articulating mechanism 110's communication hardware component 172, and then to computer hardware component 162 which commands the articulating mechanism to move the capture device 130 to a dynamic point within its range of motion. Upon receiving these communications, the host vehicle 100's computer hardware component 160 and the articulating mechanism's computer hardware component 162 compute varying algorithms to optimize trajectories and capture of aircraft 120 by adjusting locations or relative motion. The algorithm within computer hardware component 160 combines the accelerations and rotational velocities of host vehicle 100, as well as the relative distances and angles from the sensor receiver 147 to compute the precise relative point to fly to for capture or to launch. This process repeats until aircraft 120 is at the calculated, relative point.

As another embodiment, the sensor transmitter 150 and sensor receiver 145 may be reversed and mounted on the opposing devices.

Another embodiment would be that the method and algorithms for calculating these relative positions of aircraft 120's relative positions can be computed on any other computer hardware component 165 globally or locally. In this case the relative position is communicated back to aircraft 120 via communications device 175 which then sends the relative update position to computer hardware component 165.

Another embodiment would be in a communications-denied environment so that communications hardware components 160, 162 and 165 could not transmit any messages between them. In this embodiment, aircraft 120 performs its own localization and trajectory calculations in computer hardware 165, without support from computer hardware components 160 or 162. Sensor receiver 145 provides localization position and angles from sensor transmitter 150 directly to the computer hardware component 175 for trajectory to approach capture device 130 and be captured.

Various alternative embodiments of sensor receivers and transmitters may provide relative localization and angles, including but not limited to optical-based, infrared, and radio-frequency-based systems, as will be readily understood by those skilled in the art. The communications hardware components 170, 172 and 175 can use various protocols and waveforms including, but not limited to radiofrequency (RF), cellular, Wi-Fi, wired-based or other methods known by a person skilled in the art.

The articulating mechanism 110 offers a significant advantage by enabling rapid, real-time, low latency tracking of the aircraft 120 and positioning of capture device 130. Additionally, it provides the mechanical strength necessary to withstand various forces, such as impact forces, encountered during the capture of the aircraft 120. The aforementioned forces may include, but are not limited to, any forces that are commonly understood by those skilled in the art. The articulating mechanism 110 can be, but is not limited to, a serial robot, parallel robot, gantry robot, or other mechanisms to position the capture device 130 known to those skilled in the art. Articulating Mechanism 110 has at least one capture device 130. The capture device 130 may comprise a locking mechanism for mating aircraft 120 and holding it securely while launching and recovering. The locking mechanism can be pneumatic, mechanical, electromagnetic or other mechanisms known to those skilled in the art. Another embodiment of the invention may include more than three devices (vehicle 100, articulating mechanism 110 and aircraft 120). This embodiment may include multiple aircraft 120 or vehicles 100 or articulating mechanisms 110.

Figure 3:
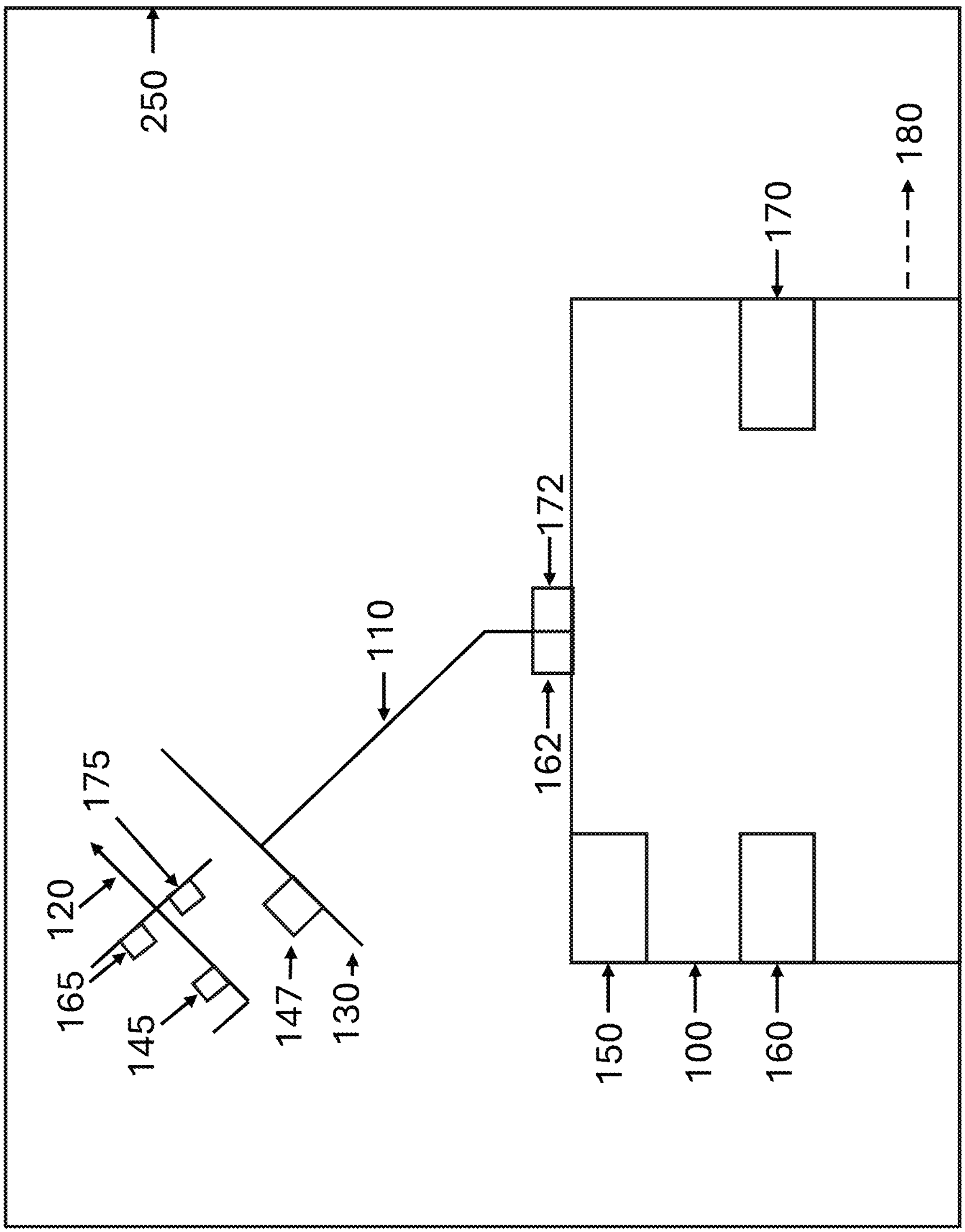
FIG. 3 is a schematic illustration of local reference frame system 250 comprising aircraft 120 being captured by capture device 130 while the host vehicle 100 is moving in direction 180.

FIG. 3 is an illustration of the same embodiments of FIG. 1 and FIG. 2 at the point of capture of aircraft 100 by the capture device 130. The sensors, communications and algorithmic methods of computing relative local reference frames are the same as depicted in FIG. 2 illustrations. Upon arriving at the computed relative point, aircraft 120 flies to remain within a set tolerance for range of motion. At the same time, via communications outlined in FIG. 2 above, computer hardware component 160 sends a capture command to communications hardware component 170, and then to communications hardware 172, and then to computer hardware component 162 which directs the capture device 130 to initiate capture. Sensor receiver 147 then sends a successful capture message to computer hardware component 162, then to communications hardware component 172, then to communications hardware component 170, and finally to the computer hardware component 160.

Figure 4:
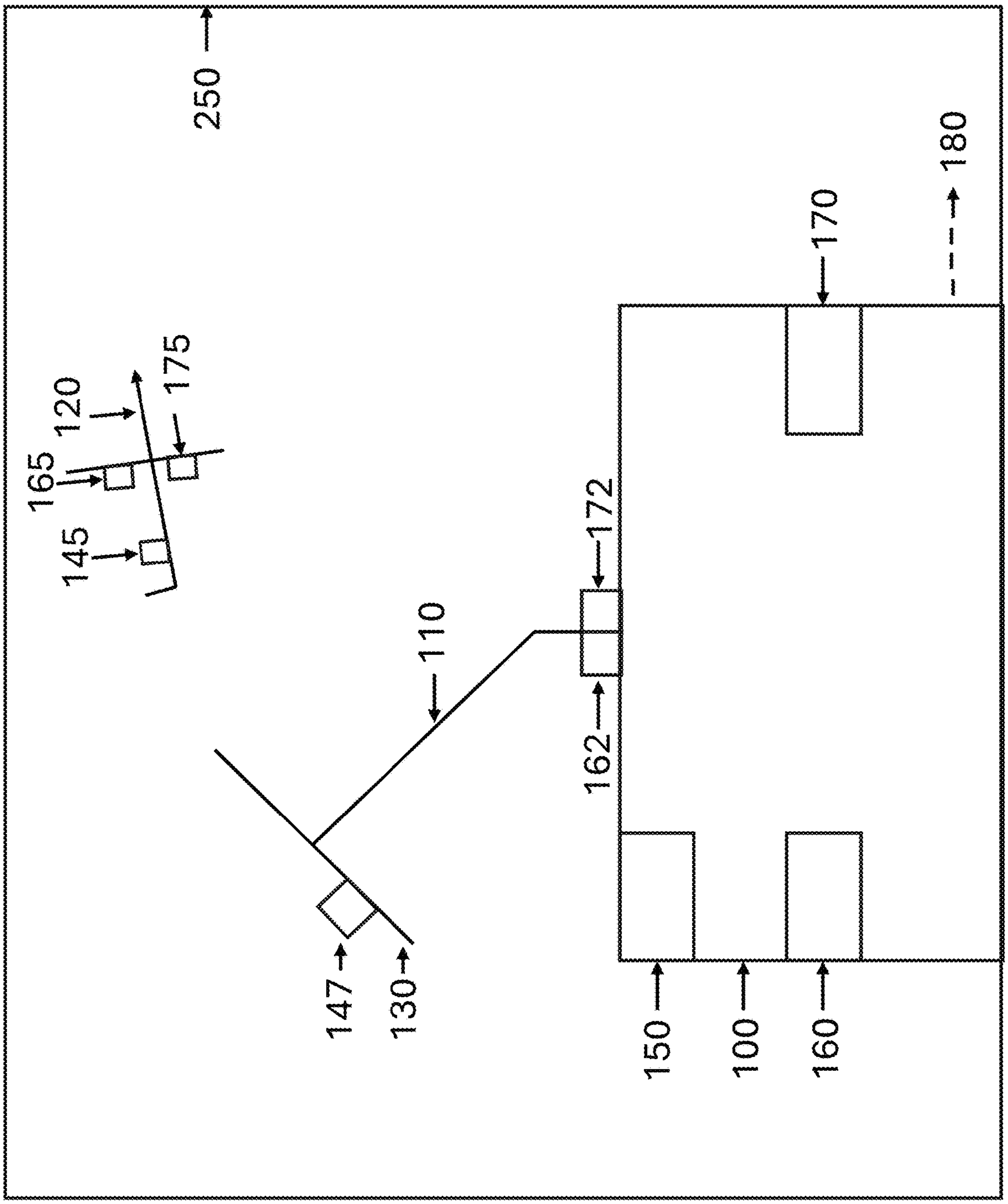
FIG. 4 is a schematic illustration of local reference frame system 250 comprising aircraft 120 being launched by capture device 130 while the host vehicle 100 is moving in direction 180.

FIG. 4 is an illustration of the same embodiments of FIG. 1 and FIG. 2 at the point of launch of aircraft 100 by the capture device 130. The same communications and sensors as of capture in FIG. 3 above, are also to command capture device 130 to release the aircraft 120. Differing in this case, the sensor receiver 147 has a null response for recognizing aircraft 120 is captured and send that message through the aforementioned communications pathway to computer hardware component 160. Aircraft 120 then flies away from the capture device 130, the articulating mechanism 110 and its host vehicle 100. The sensors, communications and algorithmic methods of computing relative local reference frames are the same as depicted in FIG. 3 illustrations.

Figure 5:
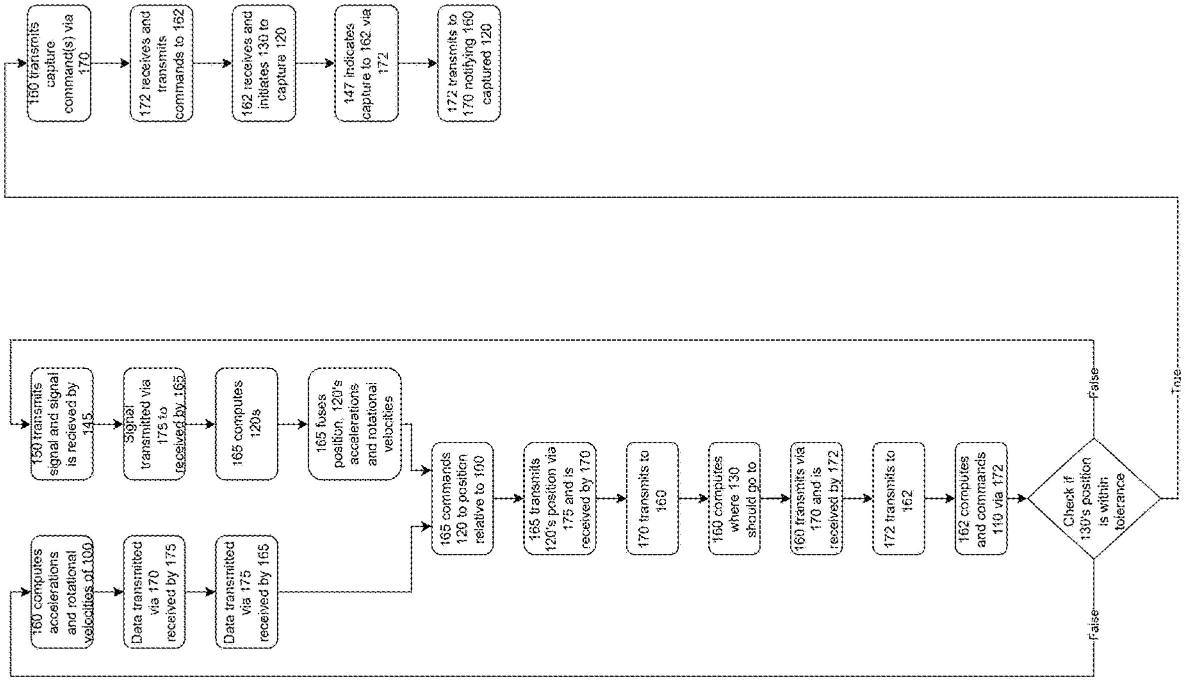
FIG. 5 is a schematic illustration of the method and algorithm to determine relative positions of three objects while moving.

FIG. 5 Is an illustration of the method and algorithm to determine relative positions of three objects while moving. This logic tree and flowchart indicates the various components and algorithms used throughout the process.

The invention claimed is:

1. A method, comprising:

determining, by computer hardware using sensors, distances and angles between three or more moving objects comprising an autonomous aircraft, a capture device, and a host vehicle;

determining, by the computer hardware, positions in a local Euclidean reference frame of the autonomous aircraft, the capture device, and the host vehicle;

determining, by the computer hardware, relative position and motion paths of the three or more moving objects with respect to each other object;

commanding, by the computer hardware, an articulating mechanism to a fixed point moving with the host vehicle, the articulating mechanism comprising a free-moving end coupled with the capture device and a secured end coupled with the host vehicle;

controlling, by the computer hardware, a position of the capture device relative to the autonomous aircraft based on sensor inputs of the sensors and the relative positions of the three or more moving objects; and controlling, by the computer hardware, the articulating mechanism to capture the autonomous aircraft using the capture device while the autonomous aircraft tracks the fixed point in the local Euclidean reference frame that moves with the host vehicle.

2. The method of claim 1, wherein the articulating mechanism is a robotic arm.

3. The method of claim 1, wherein the computer hardware is coupled with the host vehicle.

4. The method of claim 1, comprising:

controlling, by the computer hardware, the articulating mechanism to launch the autonomous aircraft from the capture device.

5. The method of claim 1, wherein the sensors include at least one of infrared sensors, visible light sensors, or electromagnetic sensors.

6. The method of claim 1, comprising:

controlling, by the computer hardware, the articulating mechanism to capture the autonomous aircraft using the capture device while the autonomous aircraft and the host vehicle travel without stopping.

7. The method of claim 1, comprising:

causing, by the computer hardware, a sensor transmitter coupled with the host vehicle to transmit a signal to the autonomous aircraft;

receiving, by a sensor coupled with the autonomous aircraft, the signal;

determining, by second computer hardware of the autonomous aircraft, a position of the autonomous aircraft in the local Euclidean reference frame using the received signal; and transmitting, using the second computer hardware, the position of the autonomous aircraft in the local Euclidean reference frame to the computer hardware.

8. The method of claim 1, comprising:

detecting, by a sensor coupled with the capture device, that the capture device captured the autonomous aircraft; and responsive to detecting that the capture device captured the autonomous aircraft, sending, by the sensor, a capture message to the computer hardware.

9. The method of claim 1, comprising:

causing, by the computer hardware, the fixed point in the local Euclidean reference frame to be within a range of motion of the free-moving end of the articulating mechanism.

10. The method of claim 1, comprising:

determining, by the computer hardware, that the autonomous aircraft is tracking the fixed point in the local Euclidean reference frame; and responsive to determining that the autonomous aircraft is tracking the fixed point, controlling, by the computer hardware, the articulating mechanism to capture the autonomous aircraft using the capture device.

11. The method of claim 1, comprising:

receiving, by a sensor of the autonomous aircraft, a signal transmitted by a sensor transmitter coupled with the host vehicle; and determining, by second computer hardware of the autonomous aircraft using the signal, a position in the local Euclidean reference frame of the autonomous aircraft.

12. The method of claim 11, comprising:

operating, by the second computer hardware, the autonomous aircraft to navigate towards the fixed point in the local Euclidean reference frame to be captured by the capture device.

13. The method of claim 11, comprising:

detecting, by the second computer hardware, that the autonomous aircraft arrived at the fixed point in the local Euclidean reference frame; and controlling, by the second computer hardware, the autonomous aircraft to maintain the position of the autonomous aircraft in the local Euclidean reference frame within a tolerance from the fixed point.

14. A system, comprising:

computer hardware comprising memory coupled with one or more processors configured to:

determine distances and angles between three or more moving objects comprising an autonomous aircraft, a capture device, and a host vehicle;

determine positions in a local Euclidean reference frame of the autonomous aircraft, the capture device, and the host vehicle;

determine relative position and motion paths of the three or more moving objects with respect to each other object;

command an articulating mechanism to a fixed point moving with the host vehicle, the articulating mechanism comprising a free-moving end coupled with the capture device and a secured end coupled with the host vehicle;

control a position of the capture device relative to the autonomous aircraft based on sensor inputs of sensors and the relative positions of the three or more moving objects; and control the articulating mechanism to capture the autonomous aircraft using the capture device while the autonomous aircraft tracks the fixed point in the local Euclidean reference frame that moves with the host vehicle.

15. The system of claim 14, wherein the fixed point in the local Euclidean reference frame is set to be within a range of motion of the free-moving end of the articulating mechanism.

16. The system of claim 14, comprising a sensor configured to:

detect that the capture device captured the autonomous aircraft; and responsive to detecting that the capture device captured the autonomous aircraft, send a capture message to the computer hardware.

17. One or more non-transitory computer readable media storing instructions thereon that, when executed by one or more processors, cause the one or more processors to perform operations, comprising:

determining distances and angles between three or more moving objects comprising an autonomous aircraft, a capture device, and a host vehicle;

determining positions in a local Euclidean reference frame of the autonomous aircraft, the capture device, and the host vehicle;

determining relative position and motion paths of the three or more moving objects with respect to each other object;

commanding an articulating mechanism to a fixed point moving with the host vehicle, the articulating mechanism comprising a free-moving end coupled with the capture device and a secured end coupled with the host vehicle;

controlling a position of the capture device relative to the autonomous aircraft based on sensor inputs of sensors and the relative positions of the three or more moving objects; and controlling the articulating mechanism to capture the autonomous aircraft using the capture device while the autonomous aircraft tracks the fixed point in the local Euclidean reference frame that moves with the host vehicle.

18. The one or more non-transitory computer readable media of claim 17, wherein the fixed point in the local Euclidean reference frame is set to be within a range of motion of the free-moving end of the articulating mechanism.

19. A method, comprising:

causing, by computer hardware, a sensor transmitter coupled with a host vehicle to transmit a signal to an autonomous aircraft;

receiving, by a sensor coupled with the autonomous aircraft, the signal;

determining, by second computer hardware of the autonomous aircraft, a position of the autonomous aircraft in a local Euclidean reference frame using the received signal;

transmitting, using the second computer hardware, the position of the autonomous aircraft in the local Euclidean reference frame to the computer hardware;

determining, by the computer hardware using sensors, distances and angles between three or more moving objects comprising the autonomous aircraft, a capture device, and the host vehicle;

determining, by the computer hardware, positions in the local Euclidean reference frame of the autonomous aircraft, the capture device, and the host vehicle;

determining, by the computer hardware, relative position and motion paths of the three or more moving objects with respect to each other object;

commanding, by the computer hardware, an articulating mechanism to a fixed point moving with the host vehicle, the articulating mechanism comprising a free-moving end coupled with the capture device and a secured end coupled with the host vehicle;

controlling, by the computer hardware, a position of the capture device relative to the autonomous aircraft based on sensor inputs of the sensors and the relative positions of the three or more moving objects; and controlling, by the computer hardware, the articulating mechanism to capture the autonomous aircraft using the capture device.

20. The method of claim 19, wherein the sensors include at least one of infrared sensors, visible light sensors, or electromagnetic sensors.

21. A method, comprising:

receiving, by a sensor of an autonomous aircraft, a signal transmitted by a sensor transmitter coupled with a host vehicle;

determining, by second computer hardware of the autonomous aircraft using the signal, a position in a local Euclidean reference frame of the autonomous aircraft;

determining, by computer hardware using sensors, distances and angles between three or more moving objects comprising the autonomous aircraft, a capture device, and the host vehicle;

determining, by the computer hardware, positions in the local Euclidean reference frame of the autonomous aircraft, the capture device, and the host vehicle;

determining, by the computer hardware, relative position and motion paths of the three or more moving objects with respect to each other object;

commanding, by the computer hardware, an articulating mechanism to a fixed point moving with the host vehicle, the articulating mechanism comprising a free-moving end coupled with the capture device and a secured end coupled with the host vehicle;

controlling, by the computer hardware, a position of the capture device relative to the autonomous aircraft based on sensor inputs of the sensors and the relative positions of the three or more moving objects; and controlling, by the computer hardware, the articulating mechanism to capture the autonomous aircraft using the capture device.

22. The method of claim 21, comprising:

operating, by the second computer hardware, the autonomous aircraft to navigate towards the fixed point in the local Euclidean reference frame to be captured by the capture device.

23. The method of claim 21, comprising:

detecting, by the second computer hardware, that the autonomous aircraft arrived at the fixed point in the local Euclidean reference frame; and controlling, by the second computer hardware, the autonomous aircraft to maintain the position of the autonomous aircraft in the local Euclidean reference frame within a tolerance from the fixed point.

24. A system, comprising:

computer hardware comprising memory coupled with one or more processors configured to:

determine distances and angles between three or more moving objects comprising an autonomous aircraft, a capture device, and a host vehicle;

determine positions in a local Euclidean reference frame of the autonomous aircraft, the capture device, and the host vehicle;

determine relative position and motion paths of the three or more moving objects with respect to each other object;

command an articulating mechanism to a fixed point moving with the host vehicle, the articulating mechanism comprising a free-moving end coupled with the capture device and a secured end coupled with the host vehicle, wherein the fixed point in the local Euclidean reference frame is set to be within a range of motion of the free-moving end of the articulating mechanism;

control a position of the capture device relative to the autonomous aircraft based on sensor inputs of sensors and the relative positions of the three or more moving objects; and control the articulating mechanism to capture the autonomous aircraft using the capture device.

25. The system of claim 24, wherein the computer hardware is configured to:

control the articulating mechanism to capture the autonomous aircraft using the capture device while the autonomous aircraft tracks the fixed point in the local Euclidean reference frame that moves with the host vehicle.

* * * * *